US010585792B2

(12) United States Patent
Shin et al.

(10) Patent No.: US 10,585,792 B2
(45) Date of Patent: Mar. 10, 2020

(54) DATA PROCESSING SYSTEM INCLUDING A HOST DISTRIBUTING DATA ACROSS MULTIPLE MEMORY SYSTEMS AND METHOD FOR THE SAME

(71) Applicant: SK hynix Inc., Gyeonggi-do (KR)

(72) Inventors: Soong-sun Shin, Gyeonggi-do (KR);
Duck-Hoi Koo, Gyeonggi-do (KR);
Yong-Tae Kim, Gyeonggi-do (KR);
Cheon-Ok Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 127 days.

(21) Appl. No.: 15/832,005

(22) Filed: Dec. 5, 2017

(65) Prior Publication Data
US 2018/0341577 A1 Nov. 29, 2018

(30) Foreign Application Priority Data

May 29, 2017 (KR) .................. 10-2017-0065824

(51) Int. Cl.
*G06F 12/02* (2006.01)
*G06F 3/06* (2006.01)
(Continued)

(52) U.S. Cl.
CPC .......... *G06F 12/0246* (2013.01); *G06F 3/061* (2013.01); *G06F 3/064* (2013.01);
(Continued)

(58) Field of Classification Search
None
See application file for complete search history.

(56) References Cited

U.S. PATENT DOCUMENTS 5,586,250 A * 12/1996 Carbonneau .......... G06F 3/0607
714/44
6,134,630 A * 10/2000 McDonald .............. G06F 3/061
711/105
(Continued)

FOREIGN PATENT DOCUMENTS

| CN | 101719377 | * | 6/2010 | ............... G11C 7/04 |
|---|---|---|---|---|
| KR | 101297563 | | 8/2013 | |
| KR | 1020160110595 | | 9/2016 | |

OTHER PUBLICATIONS

Ghemawat, Sanjay, Howard Gobioff, and Shun-Tak Leung. "The Google file system." ACM SIGOPS operating systems review. vol. 37. No. 5. ACM, 2003. (Year: 2003).*

(Continued)

*Primary Examiner* — Charles Rones
*Assistant Examiner* — Hewy H Li
(74) *Attorney, Agent, or Firm* — IP & T Group LLP

(57) ABSTRACT

A data processing system includes a host suitable for providing an access request; and a plurality of memory systems suitable for storing or reading data thereto or therefrom in response to the access request, wherein the host includes a host memory buffer suitable for storing a plurality of meta-data respectively corresponding to the plurality of memory systems, wherein each of the plurality of meta-data includes a first threshold value representing storage capacity for user data in a corresponding memory system among the plurality of memory systems, a second threshold value representing a number of read operations for logical block addresses (LBAs) of the corresponding memory system, a third threshold value representing a temperature of the corresponding memory system and respective LBAs of the plurality of memory systems.

22 Claims, 15 Drawing Sheets

(51) Int. Cl.
  *H04L 29/08*  (2006.01)
  *G06F 11/14*  (2006.01)
  *G06F 11/10*  (2006.01)

(52) U.S. Cl.
  CPC ............ *G06F 3/065* (2013.01); *G06F 3/0616* (2013.01); *G06F 3/0619* (2013.01); *G06F 3/0659* (2013.01); *G06F 3/0683* (2013.01); *G06F 3/0689* (2013.01); *G06F 11/1048* (2013.01); *G06F 11/1076* (2013.01); *G06F 11/1435* (2013.01); *H04L 67/1097* (2013.01)

(56) References Cited

U.S. PATENT DOCUMENTS

| | | | |
|---|---|---|---|
| 6,526,477 B1* | 2/2003 | Yuan | G06F 3/061 710/52 |
| 8,930,653 B1* | 1/2015 | Chatterjee | G06F 11/1453 711/154 |
| 2002/0062454 A1* | 5/2002 | Fung | G06F 1/3203 713/300 |
| 2002/0133669 A1* | 9/2002 | Devireddy | G06F 3/0605 711/114 |
| 2012/0131271 A1* | 5/2012 | Araki | G06F 3/061 711/112 |
| 2015/0363131 A1 | 12/2015 | Sinclair | |

OTHER PUBLICATIONS

WIPO machine translation of CN101719377. (Year: 2010).*

\* cited by examiner

DATA PROCESSING SYSTEM INCLUDING A HOST DISTRIBUTING DATA ACROSS MULTIPLE MEMORY SYSTEMS AND METHOD FOR THE SAME

CROSS-REFERENCE TO RELATED APPLICATIONS

The present application claims priority under 35 U.S.C. § 119(a) to Korean Patent Application No. 10-2017-0065824 filed on May 29, 2017, the disclosure of which is incorporated herein by reference in its entirety.

BACKGROUND

1. Field

Various exemplary embodiments of the present invention relate to a data processing system and an operating method thereof.

2. Description of the Related Art

The computer environment paradigm has changed to ubiquitous computing systems that can be used anytime and anywhere. That is, use of portable electronic devices such, as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption because they have no moving parts. Examples of memory systems having such advantages include universal serial bus (USB) memory devices, memory cards having various interfaces and solid state drives (SSD).

Data distribution techniques are required to utilize multiple devices. For example, there are Redundant Array of Independent Disks (RAID) schemes and networks. RAID is a technique for distributing and storing data in a plurality of hard disk devices.

SUMMARY

Various embodiments of the present invention are directed to a memory system with improved data efficiently.

In accordance with an embodiment of the present invention, A data processing system may include a host suitable for providing an access request; and a plurality of memory systems suitable for storing or reading data thereto or therefrom in response to the access request, wherein the host includes a host memory buffer suitable for storing a plurality of meta-data respectively corresponding to the plurality of memory systems, wherein each of the plurality of meta-data includes a first threshold value representing storage capacity for user data in a corresponding memory system among the plurality of memory systems, a second threshold value representing a number of read operations for logical block addresses (LBAs) of the corresponding memory system, a third threshold value representing a temperature of the corresponding memory system and respective LBAs of the plurality of memory systems.

The host may further update the plurality of meta-data including the first threshold values corresponding to the plurality of memory systems in response to requests from the plurality of memory systems, respectively, and wherein the host further divides data having a greater size than the first threshold value among sequentially generated data such that each of a plurality of divided data has a predetermined size, and controls the plurality of memory systems to store the divided data in distributed way.

The host may further control the plurality of memory systems to store the data in distributed way according to a security level of the data.

The host may further control the plurality of memory systems to store one or more of duplicated data and parity data corresponding to the data in distributed way according to the security level of the data.

The host may further update the plurality of meta-data including the LBAs corresponding to the plurality of memory systems in response to requests from the plurality of memory systems, respectively, and may further control the plurality of memory systems to store the data in distributed way according to the plurality of updated meta-data.

The host may further control the plurality of memory systems to store parity data and duplicated data corresponding to the data in another memory system, which is different from a memory system storing the data, among the plurality of memory systems when the data is stored in the memory system.

The host may further update the plurality of meta-data including the second threshold values corresponding to the plurality of memory systems in response to requests from the plurality of memory systems, respectively, and, when a first data stored in a first memory system among the plurality of memory systems is read a greater number of times than the second threshold value included in the plurality of updated meta-data, the host may further control the plurality of memory systems to move the first data to a second memory system among the plurality of memory systems, and the second memory system may request the host to update a meta-data corresponding to the second memory system among the plurality of meta-data such that the meta-data corresponding to the second memory system includes the LBA corresponding to the first data.

The host may further update the plurality of meta-data including the third threshold values corresponding to the plurality of memory systems in response to requests from the plurality of memory systems, respectively, and may further control the plurality of memory systems to throttle one or more memory systems having a greater temperature than the third threshold value among the plurality of memory systems.

The host may further control the plurality of memory systems to first store the data in another memory system other than the throttled memory systems among plurality of memory systems.

When data is to be read from the throttled memory systems, the host may further control the plurality of memory systems to read duplicated data corresponding to the data to be read and stored in another memory system other than the throttled memory system among the plurality of memory systems.

In accordance with an embodiment of the present invention, an operating method of a data processing system including a host having a host memory buffer and including a plurality of memory systems, the operating method may include a first step of updating, by the controller, a plurality of meta-data corresponding to the plurality of memory systems in response to requests from the plurality of memory systems, respectively; and a second step of controlling, by the controller, the plurality of memory systems to store data in distributed way according to the plurality of meta-data, wherein each of the plurality of meta-data includes a first threshold value representing storage capacity for user data in a corresponding memory system among the plurality of memory systems, a second threshold value representing a number of read operations for logical block addresses (LBAs) of the corresponding memory system, a third threshold value representing a temperature of the corresponding memory system and respective LBAs of the plurality of memory systems.

The first step may be performed by updating the plurality of meta-data including the first threshold values corresponding to the plurality of memory systems in response to requests from the plurality of memory systems, respectively, and the second step may be performed by dividing data having a greater size than the first threshold value among sequentially generated data such that each of a plurality of divided data has a predetermined size, and controlling the plurality of memory systems to store the divided data in distributed way.

The second step may be performed by further controlling the plurality of memory systems to store the data in distributed way according to a security level of the data.

It may further comprise controlling, by the controller, the plurality of memory systems to store one or more of duplicated data and parity data corresponding to the data in distributed way according to the security level of the data.

The first step may be performed by updating the plurality of meta-data including the LBAs corresponding to the plurality of memory systems in response to requests from the plurality of memory systems, respectively, and the second step may be performed by controlling the plurality of memory systems to store the data in distributed way according to the plurality of updated meta-data.

It may further comprise controlling, by the controller, the plurality of memory systems to store parity data and duplicated data corresponding to the data in another memory system, which is different from a memory system storing the data among the plurality of memory systems when the data is stored in the memory system.

The first step may be performed by updating the plurality of meta-data including the second threshold values corresponding to the plurality of memory systems in response to requests from the plurality of memory systems, respectively, and may further comprise, when a first data stored in a first memory system among the plurality of memory systems is read a greater number of times than the second threshold value included in the plurality of updated meta-data, a third step of controlling, by the controller, the plurality of memory systems to move the first data to a second memory system among the plurality of memory systems; and a fourth step of requesting, by the second memory system, the host to update a meta-data corresponding to the second memory system among the plurality of meta-data such that the meta-data corresponding to the second memory system includes the LBA corresponding to the first data.

The first step may be performed by updating the plurality of meta-data including the third threshold values corresponding to the plurality of memory systems in response to requests from the plurality of memory systems, respectively, and the second step may be performed by controlling the plurality of memory systems to throttle one or more memory systems having a greater temperature than the third threshold value among the plurality of memory systems.

It may further comprise controlling, by the controller, the plurality of memory systems to first store the data in another memory system other than the throttled memory systems among plurality of memory systems.

It may further comprise controlling, by the controller, when data is to be read from the throttled memory systems, the plurality of memory systems to read duplicated data corresponding to the data to be read and stored in another memory system other than the throttled memory system among the plurality of memory systems.

In accordance with an embodiment of the present invention, A data processing system may include a plurality of memory systems each including a controller and a memory device; and a host suitable for accessing memory systems according to redundant array of independent disks (RAID) levels and meta-data stored therein and respectively corresponding to the memory systems, wherein the host controls the memory systems to store user data in distributed way for balancing storage capacities and access counts of the memory systems.

DETAILED DESCRIPTION

Figure 1:
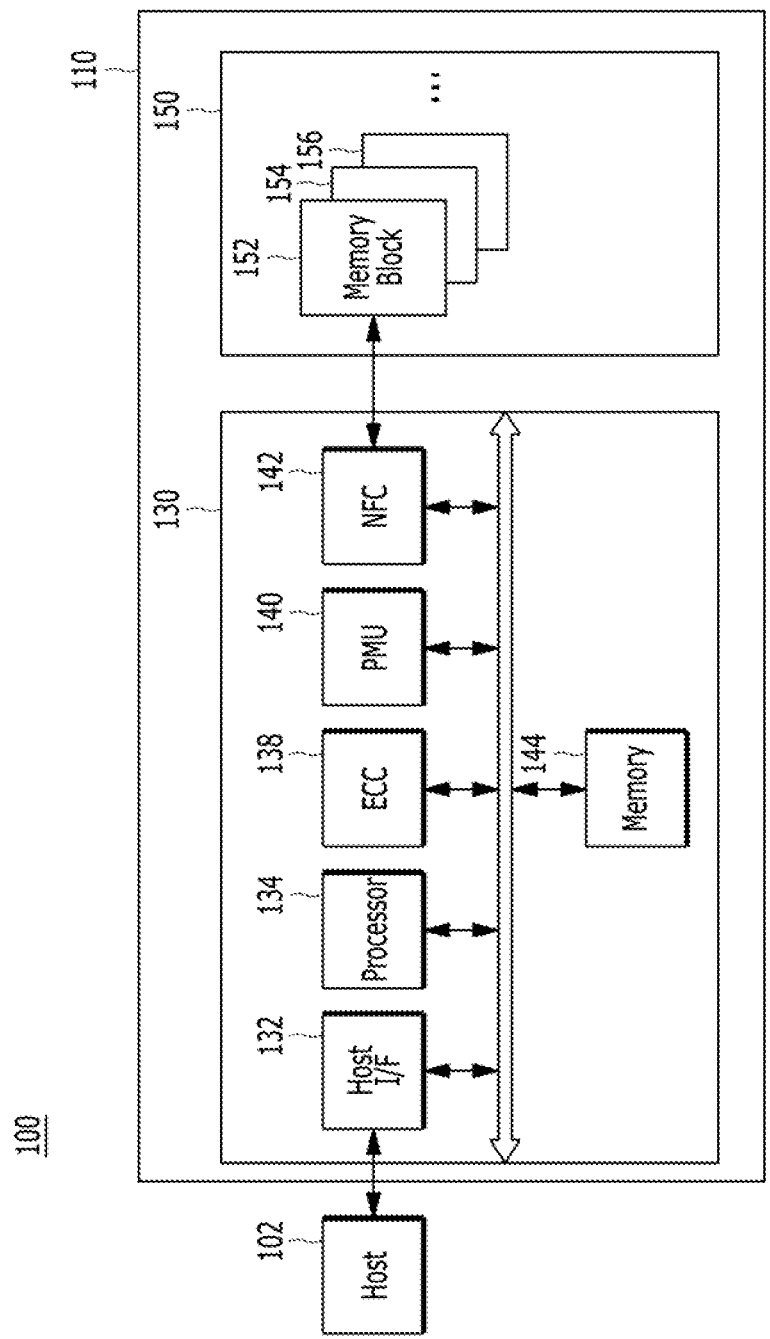
FIG. 1 is a block diagram illustrating a data processing system including a memory system, in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third" and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include, for example, a portable electronic device such as a mobile phone, an MP3 player and a laptop computer or an electronic device such as a desktop computer, a game player, a TV, a projector, and the like.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM) and nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM), and a flash memory.

The memory system 110 may include a memory device 150, which stores data to be accessed by the host 102, and a controller 130, which may control storage of data in the memory device 150.

The controller 130 and the memory device 150 may be integrated into a single semiconductor device, which may be included in the various types of memory systems as exemplified above.

The memory system 110 may be part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, where each of the memory blocks 152 to 156 may include a plurality of pages. Each of the pages may include a plurality of memory cells to which a plurality of word lines (WL) are electrically coupled.

The controller 130 may control overall operations of the memory device 150, such as read, write, program, and erase operations. For example, the controller 130 of the memory system 110 may control the memory device 150 in response to a request from the host 102. The controller 130 may provide the data read from the memory device 150 to the host 102, and/or may store the data provided from the host 102 into the memory device 150.

The controller 130 may include a host interface (I/F) unit 132, a processor 134, an error correction code (ECC) unit 138, a power management unit (PMU) 140, a memory device controller 142 such as a NAND flash controller (NFC) 142, and a memory 144 all operatively coupled via an internal bus.

The host interface unit 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (PATA), small computer system interface (SCSI), enhanced small disk interface (ESDI), integrated drive electronics (IDE), and the like.

The ECC unit 138 may detect and correct errors in the data read from the memory device 150 during the read operation. However, the ECC unit 138 may not correct error bits when the number of the error bits is greater than or equal to a threshold number of correctable error bits, and may instead output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include all circuits, modules, systems, or devices for the error correction operation.

The PMU 140 may provide and manage power of the controller 130.

The NFC 142 may serve as a memory/storage interface between the controller 130 and the memory device 150 to allow the controller 130 to control the memory device 150 in response to a request from the host 102. The NFC 142 may generate a control signal for the memory device 150 and process data to be provided to the memory device 150 under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be implemented with a volatile memory. For example, the memory 144 may be implemented with, but not limited to, a static random access memory (SRAM) or a dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware, which is referred to as a flash translation layer (FTL), to control the general operations of the memory system 110.

The processor 134 may be implemented with a microprocessor or a central processing unit (CPU). The memory system 110 may include one or more processors 134.

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a three-dimensional (3D) stack structure and the reliability of the memory system 100, and thus a reliable bad block management is required.

Figure 2:
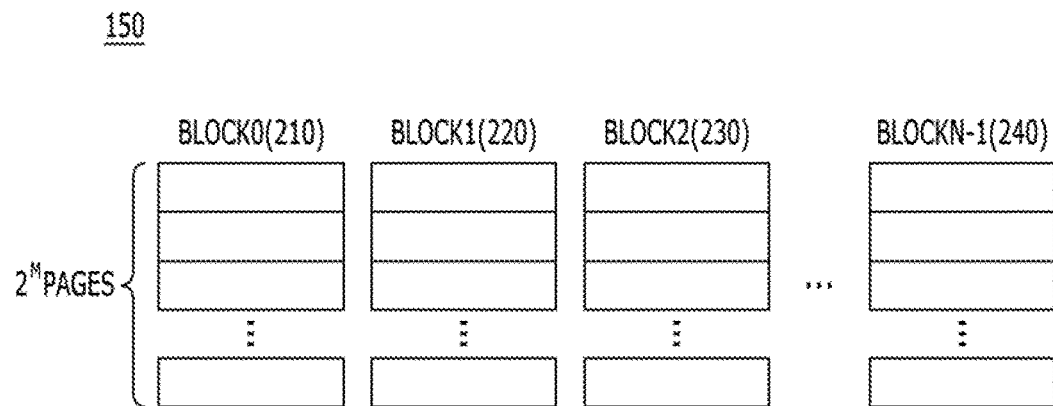
FIG. 2 is a schematic diagram illustrating an exemplary configuration of a memory device employed in the memory system shown in FIG. 1.

FIG. 2 is a schematic diagram illustrating the memory device 150 shown in FIG. 1.

Referring to FIG. 2, the memory device 150 may include the plurality of memory blocks BLOCK 0 to BLOCKN-1, and each of the blocks BLOCK 0 to BLOCKN-1 may include a plurality of pages, for example, $2^M$ pages, the number of which may vary according to circuit design. The memory device 150 may include a plurality of memory blocks, as single level cell (SLC) memory blocks and multi-level cell (MLC) memory blocks, according to the number of bits that may be stored or expressed in each memory cell. The SLC memory block may include a plurality of pages, which are implemented with memory cells each capable of storing 1-bit data. The MLC memory block may include a plurality of pages, which are implemented with memory cells each capable of storing multi-bit data, for example, two or more-bit data. An MLC memory block including a plurality of pages, which are implemented with memory cells that are each capable of storing 3-bit data, may be defined as a triple level cell (TLC) memory block.

Each of the plurality of memory blocks 210 to 240 may store the data provided from the host device 102 during a write operation, and may provide stored data to the host 102 during a read operation.

Figure 3:
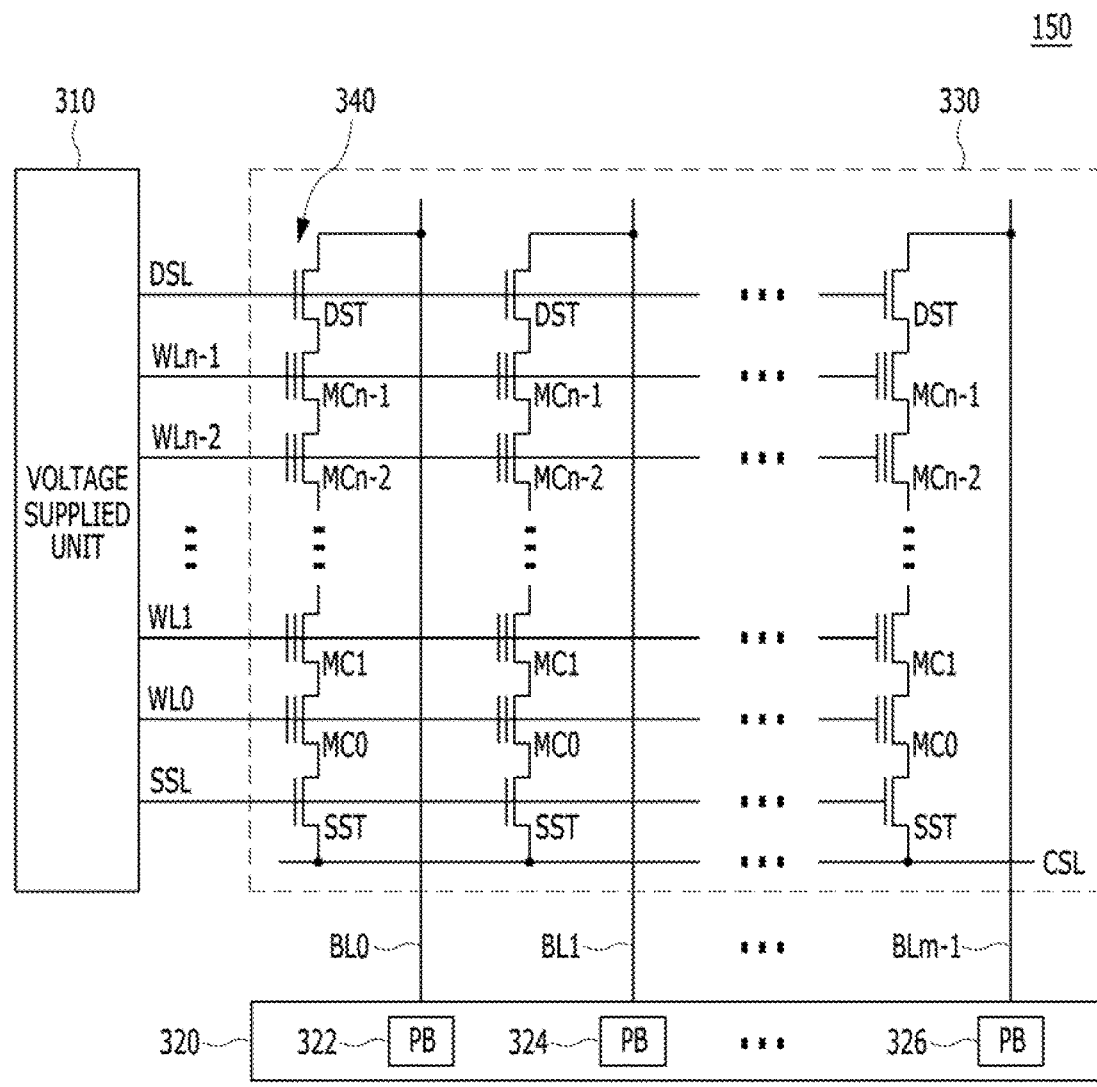
FIG. 3 is a circuit diagram illustrating an exemplary configuration of a memory cell array of a memory block in the memory device shown in FIG. 2.

FIG. 3 is a circuit diagram illustrating a memory block 330 of the memory device 150 shown in FIG. 2.

Referring to FIG. 3, the memory block 330 ay correspond to any of the plurality of memory blocks 152 to 156.

Referring to FIG. 3, the memory block 330 of the memory device 150 may include a plurality of cell strings 340 that are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm-1, respectively. For reference, in FIG. 3, 'DSL' denotes a drain select line, 'SSL' denotes a source select line, and 'CSL' denotes a common source line.

While FIG. 3 only shows, as an example, the memory block 330 which is configured by NAND flash memory cells, it is to be noted that the memory block 330 of the memory device 150 according to the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supplied unit 310 of the memory device 150 may provide word line voltages, for example, a program voltage, a read voltage, and a pass voltage, to be supplied to respective word lines according to an operation mode and voltages to be supplied to bulks for example, well regions in which the memory cells are formed. The voltage supplied unit 310 may perform a voltage generating operation under the control of a control circuit (not shown). The voltage supplied unit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array and drive bit lines according to the received data. The read/write circuit 320 may include a plurality of page buffer 322 to 326 respectively corresponding to columns (or bit lines) or column pairs (or bit line pairs), and each of the page buffers 322 to 326 may include a plurality of latches (not illustrated).

Figure 4:
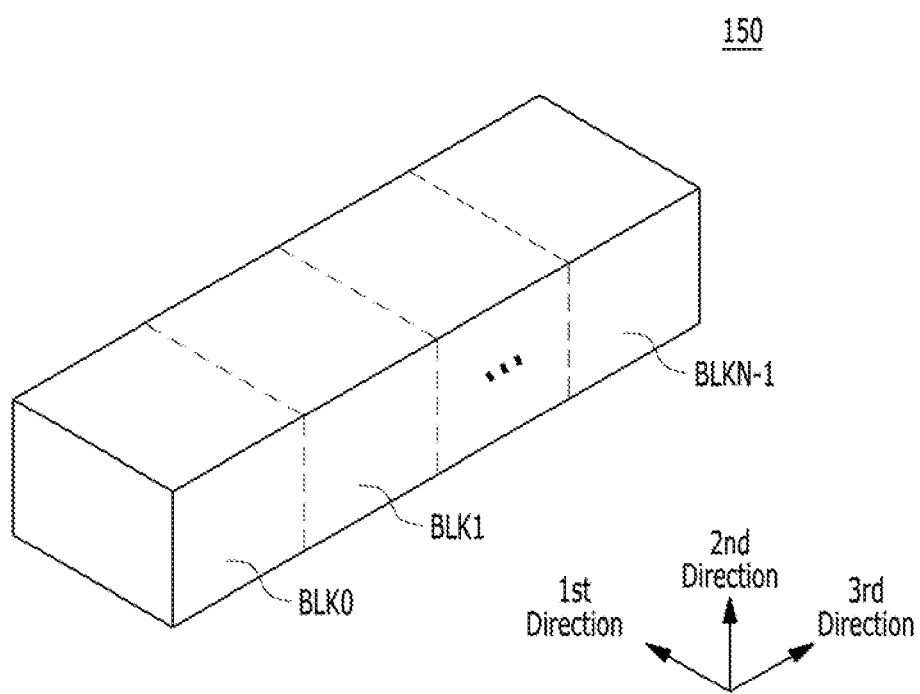
FIG. 4 is a schematic diagram illustrating an exemplary three-dimensional structure of the memory device shown in FIG. 2.

FIG. 4 is a schematic diagram illustrating a three-dimensional (3D) structure of the memory device 150 shown in FIG. 2.

The memory device 150 may be embodied by a two-dimensional (2D) or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN-1 each having a 3D structure (or vertical structure).

Figure 5:
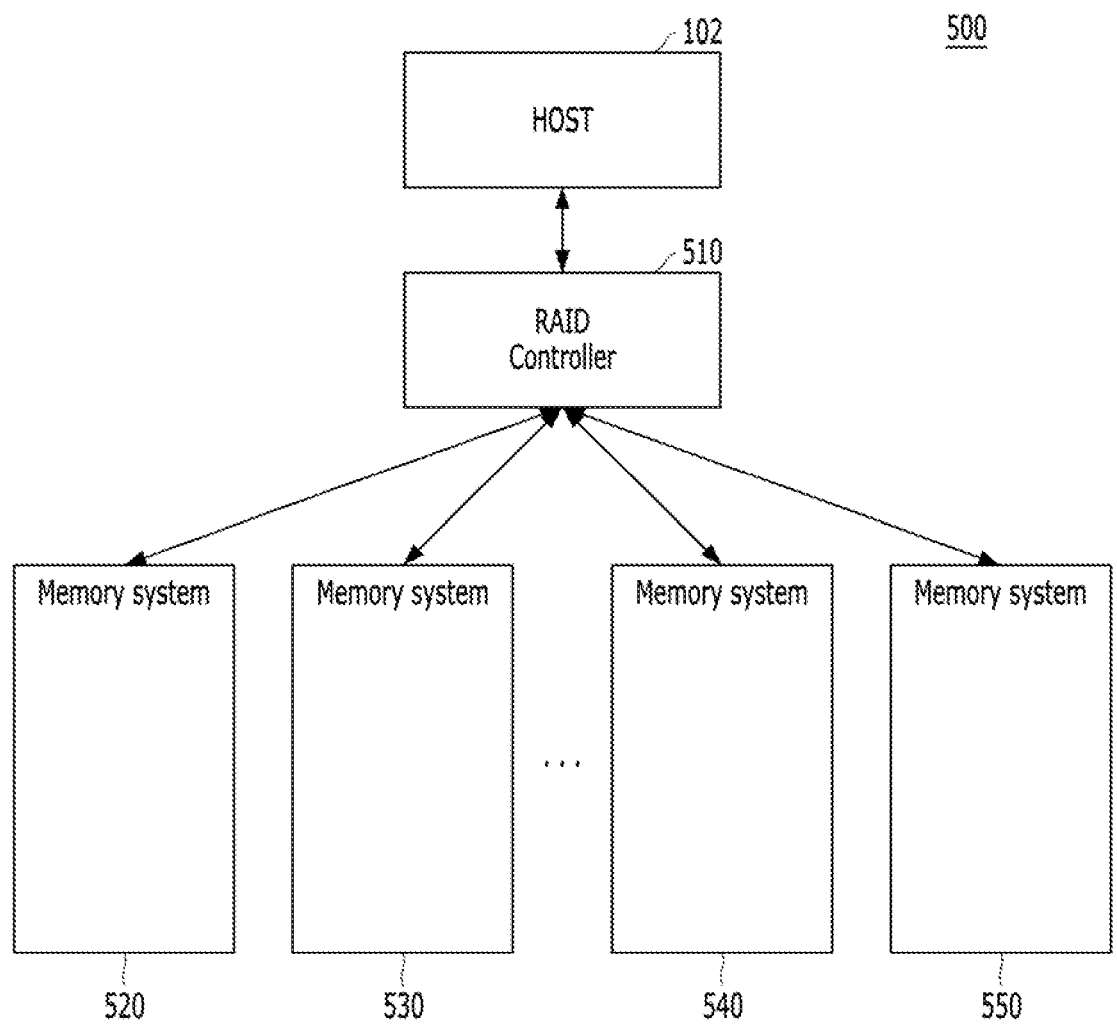
FIG. 5 is a block diagram illustrating a Redundant Array of Independent Disks (RAID) system including a plurality of memory systems to according to a prior art.

FIG. 5 is a block diagram illustrating a Redundant Array of Independent Disks (RAID) system 500 including a plurality of memory systems 520 to 550 according to a prior art.

The RAID system 500 includes the plurality of memory systems 520 to 550 and a RAID controller 510 configured to control the plurality of memory systems 520 to 550.

The RAID controller 510 includes an input interface and an output interface. The input interface communicates with the plurality of memory systems 520 to 550 and the output interface communicates with the host 102.

The RAID system 500 has increased performance by operating the plurality of memory systems 520 to 550 in parallel and increased reliability by storing data in duplicate. There are many schemes for the RAID system 500 to store data in distributed way. The schemes are RAID levels.

For example, the RAID0 is a scheme for sequentially distributing and storing data into the plurality of memory systems 520 to 550. The RAID0 makes the RAID system 500 have greatest performance due to a maximum dispersal capacity of the RAID0. However, because of absence of duplicated data or parity data, the RAID system 500 of the RAID0 shows the highest usage rate and the lowest reliability. The RAID1 maximizes the reliability of the RAID system 500 by storing a single piece of data into a couple of memory systems in duplicate. The performance of the RAID system 500 of the RAID1 becomes greater due to increasing parallelism of operations as a number of the memory systems included in the RAID system 500 increases. However, the RAID system 500 of the RAID1 uses only a half of full storage capacity of the memory systems, which causes lower usage rate of the memory systems. The RAID system 500 of the RAID5 stores data in the same way as the RAID0, and further stores parity data corresponding to user data in a particular storage space of the memory systems. The RAID system 500 of the RAID5 has advantages of the RAID0 and RAID1. However, the RAID system 500 of the RAID5 has disadvantage of increased overhead due to computation of the parity data.

When the plurality of memory systems 520 to 550 perform program operations in response to a write command from the host 102, the RAID controller 510 selects at least one memory system corresponding to RAID level information of the write command among the plurality of memory systems 520 to 550 and store data corresponding to the write command into the selected memory system. Also, when the plurality of memory systems 520 to 550 perform read operations in response to a read command from the host 102, the RAID controller 510 selects at least one memory system corresponding to RAID level information of the read command among the plurality of memory systems 520 to 550 and provide data corresponding to the read command from the selected memory system to the host 102.

The RAID system 500 has a disadvantage of high cost for setting up the system. Also, the RAID system 500 has functions of data security and error correction by utilizing duplicated data and parity data. However, the RAID system 500 has a disadvantage that the system cannot be secured when there are some problems such as simultaneous and distributed malfunctions of the memory systems.

FIGS. 6 to 10 are diagrams illustrating an operation of a data processing system 100 in accordance with an embodiment of the present invention. FIGS. 6 to 10 show a host memory buffer (HMB) 610 included in the host 102 and a plurality of memory systems 620 to 650 commonly coupled to the host 102. Each of the plurality of memory systems 620 to 650 may correspond to the memory system 110 described with reference to FIGS. 1 to 4.

Referring to FIGS. 6 to 10, the host 102 may control the plurality of memory systems 620 to 650 to store data in distributed way in order to increase data processing efficiency of the data processing system 100.

The RAID system 500 described with reference to FIG. 5 is economically inefficient since the RAID system 500 cannot efficiently distribute user data to the plurality of memory systems 520 to 550 and include the RAID controller 510. In accordance with an embodiment of the present invention, the data processing system 100 including the plurality of memory systems 620 to 650 may efficiently control the plurality of memory systems 620 to 650 by utilizing the HMB 610 of the host 102 without utilizing the RAID controller 510 consuming physical space.

Figure 6:
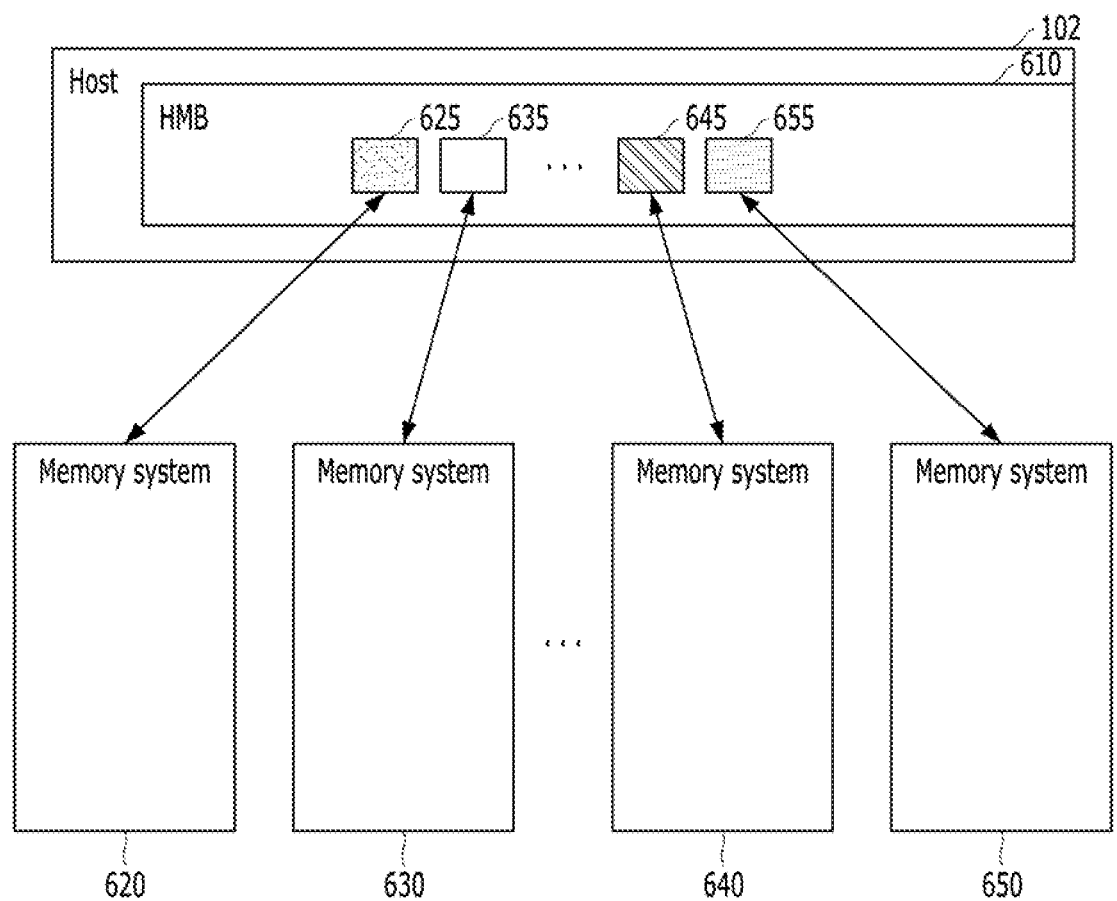
FIG. 6 is a diagram illustrating an operation of the data processing system in accordance with an embodiment of the present invention.

FIG. 6 is a diagram illustrating an operation of the data processing system 100 in accordance with an embodiment of the present invention.

The HMB 610 may store a plurality of meta-data 625 to 655 respectively corresponding to the plurality of memory systems 620 to 650. The plurality of meta-data 625 to 655 may include information of the plurality of memory systems 620 to 650. Further, the plurality of memory systems 620 to 650 may request the host 102 to update the plurality of meta-data 625 to 655 as occasion demands, respectively.

Each of the plurality of meta-data 625 to 655 may include a first threshold value representing storage capacity for user data in a corresponding memory system, a second threshold value representing a number of read operations for logical block addresses (LBAs) of the corresponding memory system, a third threshold value representing a temperature of the corresponding memory system and information of LBAs of the plurality of memory systems 620 to 650. The host 102 may control the plurality of memory systems 620 to 650 to effectively store in distributed way according to the plurality of meta-data 625 to 655.

For example, when the first meta-data 625 corresponding to the first memory system 620 includes information about a read count and a temperature, and the second meta-data 635 corresponding to the second memory system 630 includes information about a read count and a temperature, the first memory system 620 may request the host 102 to update the first meta-data 625 regardless of update timing of the second meta-data 635. Also, each of the plurality of memory systems 620 to 650 may store the same type of meta-data (e.g., the information about the read count and the temperature) into the HMB 610. As a result, the HMB 610 may manage the plurality of meta-data 625 to 655 for the plurality of memory systems 620 to 650.

Hereinafter, described will be an operation of the host 102 according to the plurality of meta-data 625 to 655 described above.

Figure 7:
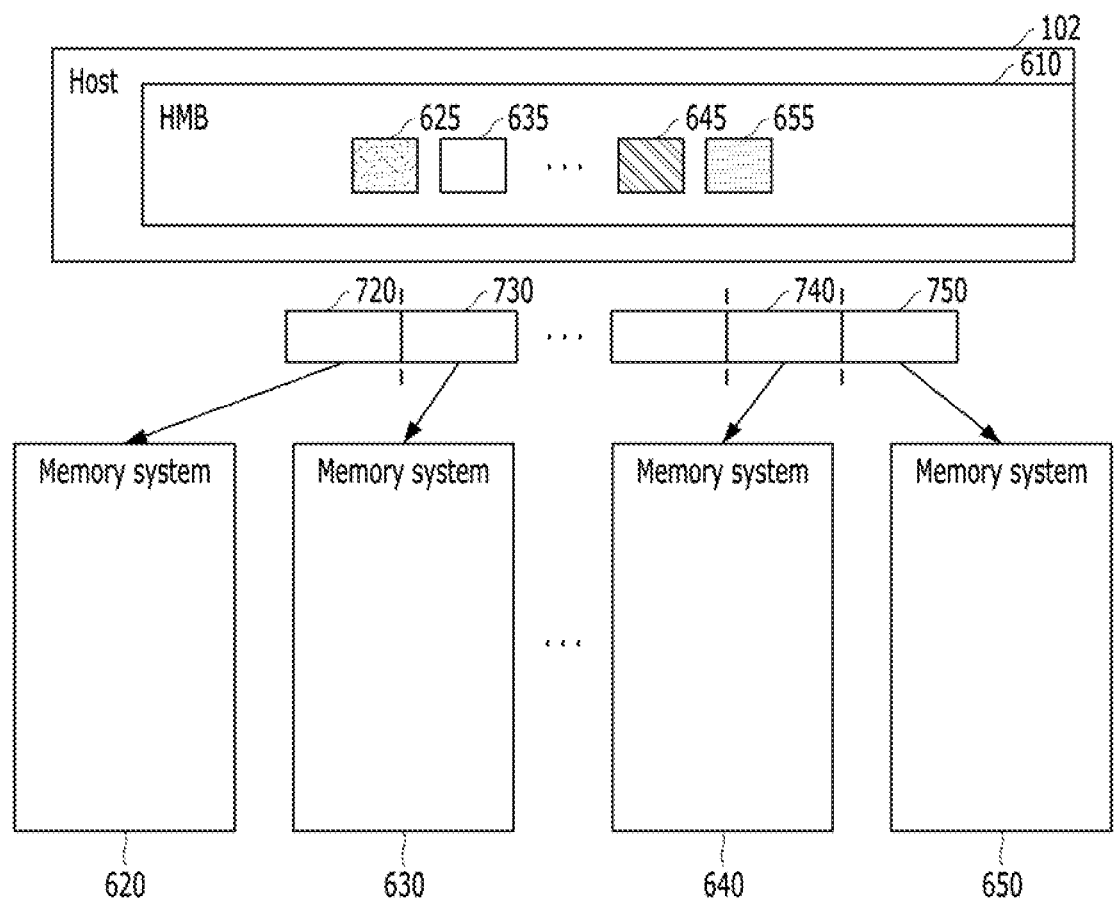
FIG. 7 is a diagram illustrating an operation of the host in accordance with an embodiment of the present invention.

FIG. 7 is a diagram illustrating an operation of the host 102 in accordance with an embodiment of the present invention.

First, the plurality of memory systems 620 to 650 may request the host 102 to update the first threshold values included in the plurality of meta-data 625 to 655 respectively corresponding to the plurality of memory systems 620 to 650.

The host 102 may divide user data such that the plurality of the divided user data have appropriate sizes to be stored into the plurality of memory systems 620 to 650, respectively, by comparing the size of the user data with the first threshold values included in the plurality of meta-data 625 to 655 respectively corresponding to the plurality of memory systems 620 to 650.

That is when user data to be stored in one memory system among the plurality of memory systems 620 to 650 has a bigger size than the first threshold value included in a corresponding meta-data, the host 102 may divide the user data such that each of a plurality of the divided user data has a predetermined size (e.g., one of sizes 32 KB, 64 KB and 128 KB). The host 102 may control the plurality of memory systems 620 to 650 to store the plurality of divided user data 720 to 750 in distributed way.

Further, the host 102 may control the plurality of memory systems 620 to 650 to store data therein according to security levels of user data (e.g., the RAID levels described with reference to FIG. 5).

Figure 8A:
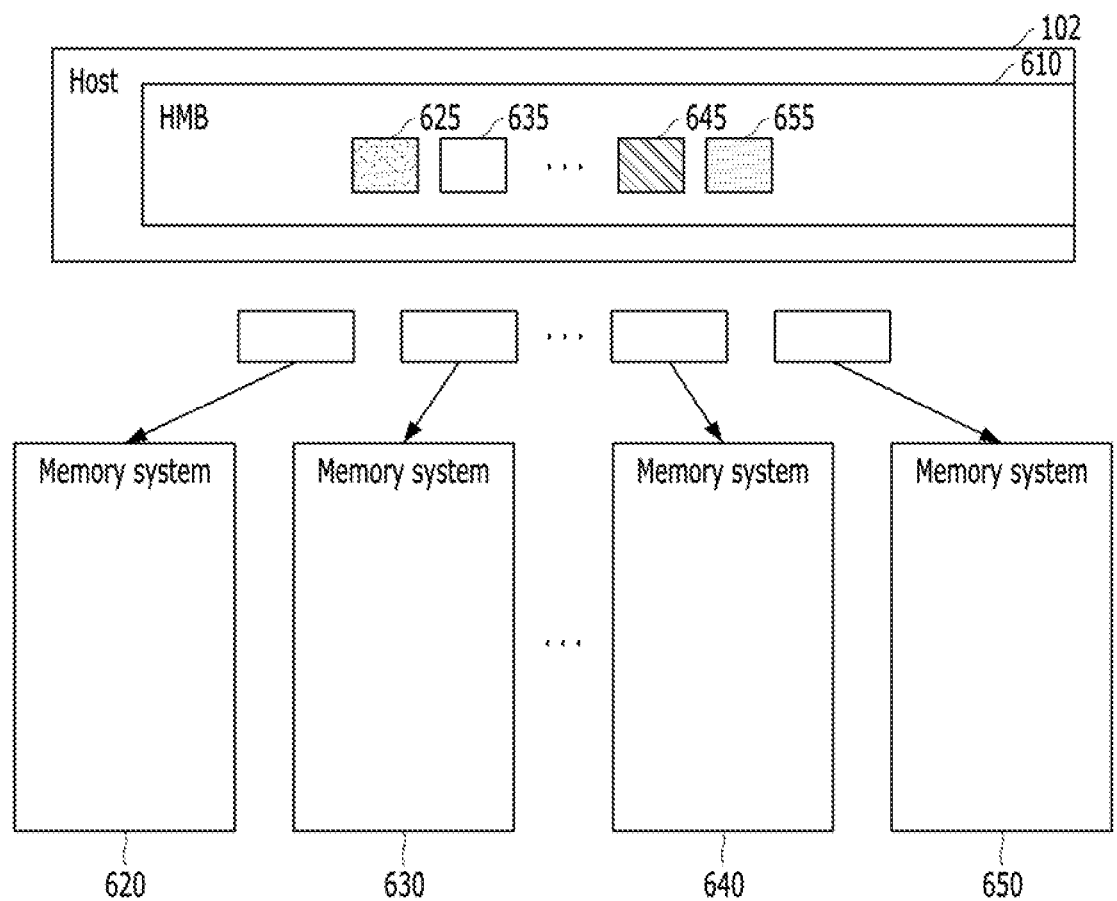
FIG. 8A is a diagram illustrating an operation of the host to data having a level of the RAID0.

FIG. 8A is a diagram illustrating an operation of the host 102 to data having a level of the RAID0.

When the security level of user data is the level of the RAID0, the host 102 may control the plurality of memory systems 620 to 650 to store the user data by way of distribution without duplicated data or parity data.

Figure 8B:
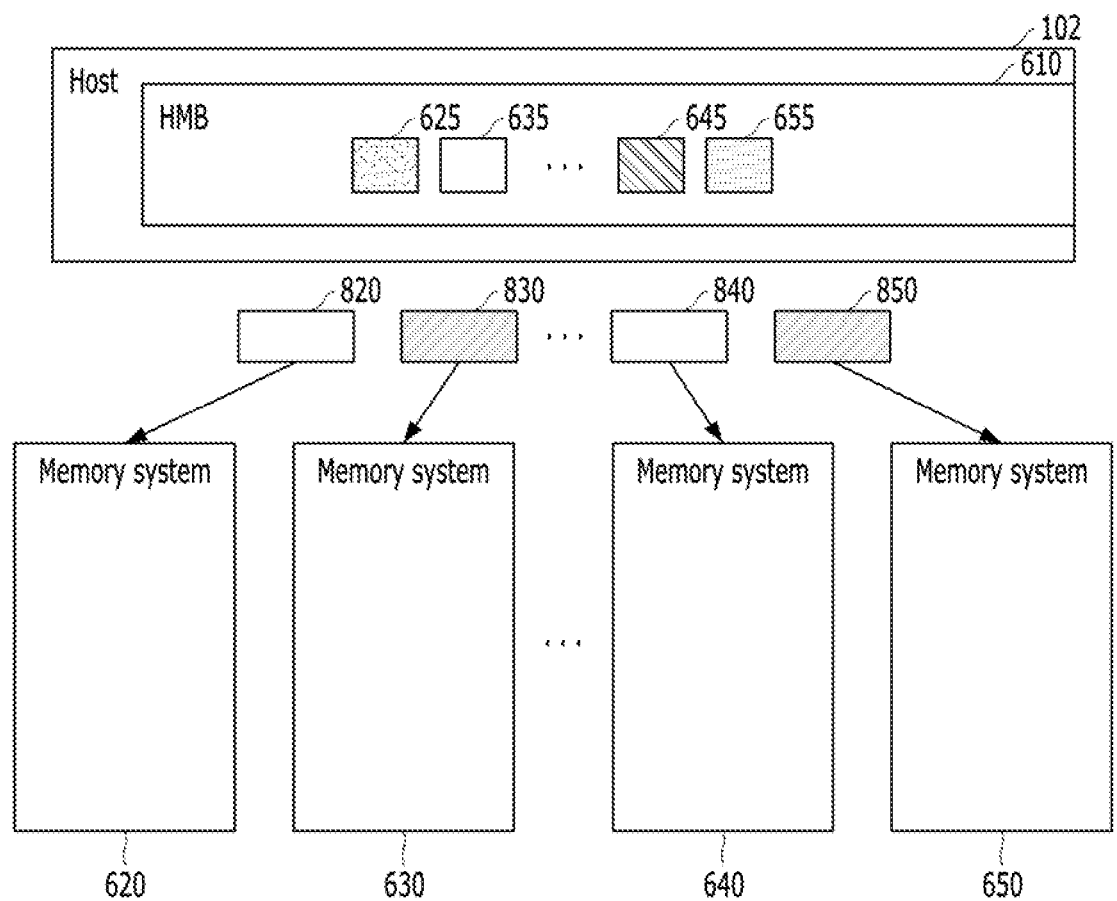
FIG. 8B is a diagram illustrating an operation of the host to data having a level of the RAID1.

FIG. 8B is a diagram illustrating an operation of the host 102 to data having a level of the RAID1.

When the security level of user data is the level of the RAID1, the host 102 may control the first memory system 620 and the third memory system 640 to respectively store a first user data 820 and a third user data 840 therein, and may control the second memory system 630 and the fourth memory system 650 to respectively store a duplicated data corresponding to the first user data 820 and a duplicated data corresponding to the third user data 840 therein.

Figure 8C:
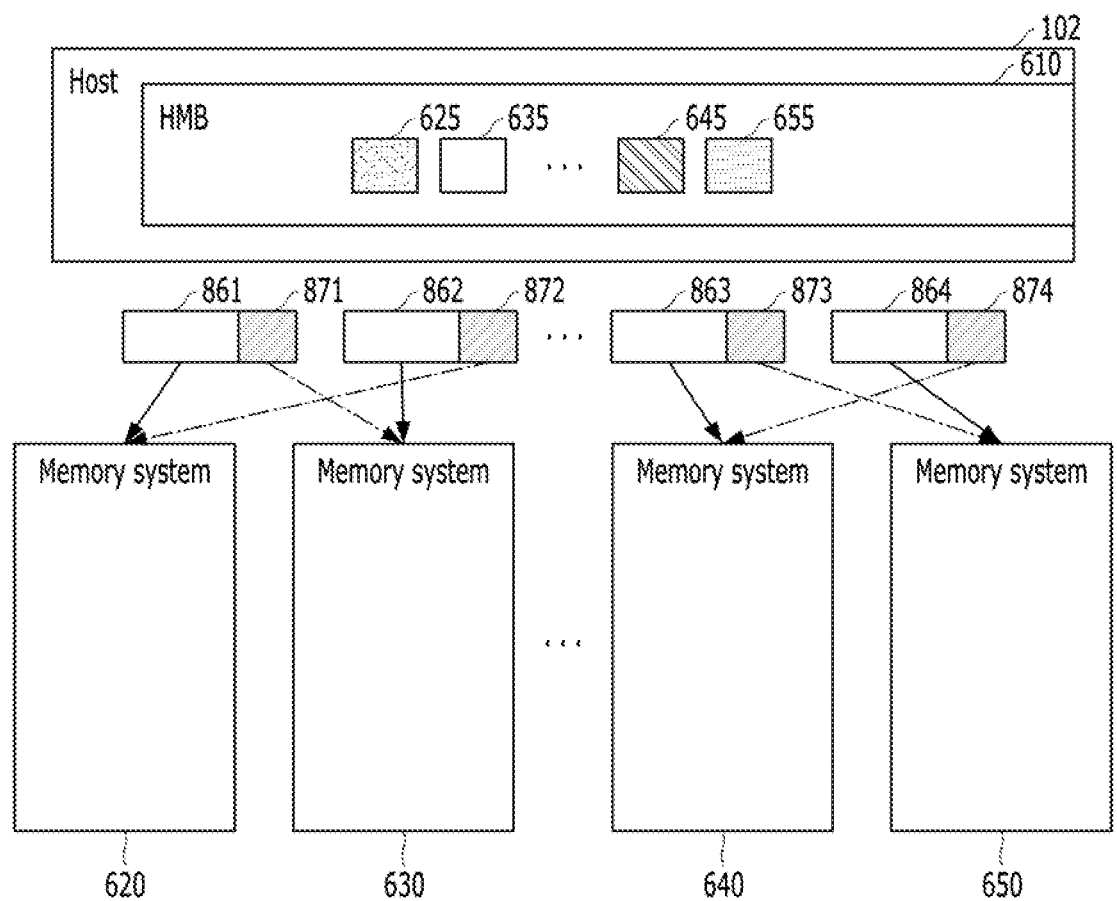
FIG. 8C is a diagram illustrating an operation of the host to data having a level of the RAID5.

FIG. 8C is a diagram illustrating an operation of the host 102 to data having a level of the RAID5.

When the security level of user data is the level of the RAID5, the host 102 may control the plurality of memory systems 620 to 650 to respectively store user data 861 to 864 in distributed way. Further, the host 102 may control the plurality of memory systems 620 to 650 to respectively store parity data 871 to 874 respectively corresponding to the user data 861 to 864 in distributed way.

However, each of the user data 861 to 864 and corresponding one among the parity data 871 to 874 may be stored in different memory system. For example, when the first user data 861 is stored in the first memory system 620, the first parity data 871 corresponding to the first user data 861 may be stored in the second memory system 630. That is, the first parity data 871 may be stored in another memory system other than the first memory system 620 among the plurality of memory systems 620 to 650.

Figure 9:
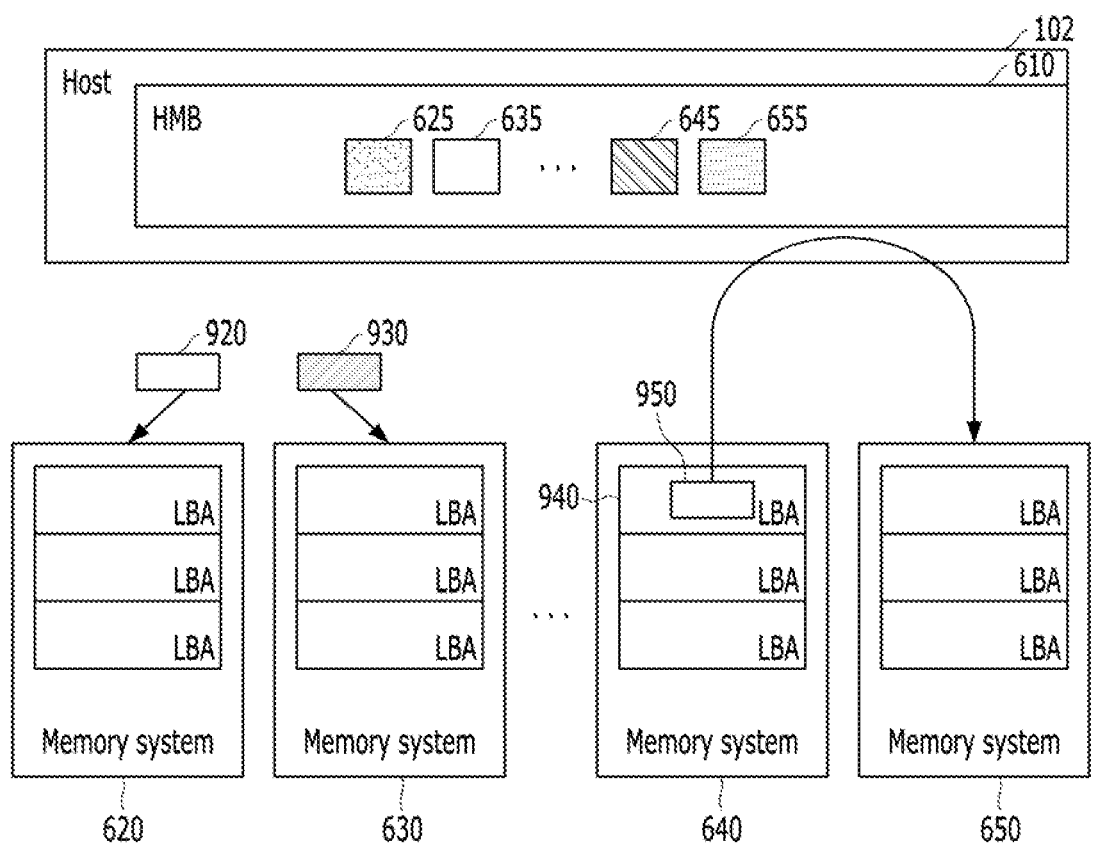
FIG. 9 is a diagram illustrating an operation of the host in accordance with an embodiment of the present invention.

FIG. 9 is a diagram illustrating an operation of the host 102 in accordance with an embodiment of the present invention.

First, the plurality of memory systems 620 to 650 may request the host 102 to update the information of LBAs included in the plurality of meta-data 625 to 655 respectively corresponding to the plurality of memory systems 620 to 650.

The host 102 may select one memory system to store user data among the plurality of memory systems 620 to 650 according to LBAs of the plurality of memory systems 620 to 650, which are respectively included in the plurality of meta-data 625 to 655.

Further, the host 102 may select one memory system to store one or more of duplicated data and parity data corresponding to user data other than the memory system to store the user data among the plurality of memory systems 620 to 650 according to the LBAs. For example, the host 102 may select and control the first memory system 620 to store user data 920 and may select and control the second memory system 630 to store one or more 930 of duplicated data and parity data corresponding to the user data 920, according to the LBA corresponding to the user data 920 included in the first meta-data 625.

On the other hand, the plurality of memory systems 620 to 650 may request the host 102 to update the second threshold values included in the plurality of meta-data 625 to 655 respectively corresponding to the plurality of memory systems 620 to 650.

When data corresponding to a particular LBA is read a greater number of times than the second threshold value representing a number of read operations for the particular LBA included in each of the plurality of meta-data 625 to 655, the host 102 may control the plurality of memory systems 620 to 650 to move the data, which corresponds to the particular LBA and a number of read operations to which is greater than the second threshold value, from a source memory system currently storing the data to a target memory system among the plurality of memory systems 620 to 650. Further, the target memory system storing the moved data may request the host 102 to update a corresponding data among the plurality of meta-data 625 to 655 such that the move of the data is reflected into the LBA of the meta-data. As a result, when the moved data is to be read, the host 102 may control the plurality of memory systems 620 to 650 to read the moved data from the target memory system such that the moved data is read a number of times under the second threshold value.

For example, when a first data 950 corresponding to a first LBA 940 is read a greater number of times than the second threshold value representing a number of read operations for the first LBA 940 included in the third meta-data 645 corresponding to the third memory system 640, the host 102 may control the plurality of memory systems 620 to 650 to move the first data 950 corresponding to the first LBA 940 from the third memory system 640 to the fourth memory system 650. The fourth memory system 640 may request the host 102 to update the fourth meta-data 655 including the LBA corresponding to the moved data 950. Therefore, the host 102 may control the plurality of memory systems 620 to 650 to read the moved data 950 not from the third memory system 640 but from the fourth memory system 650.

Figure 10:
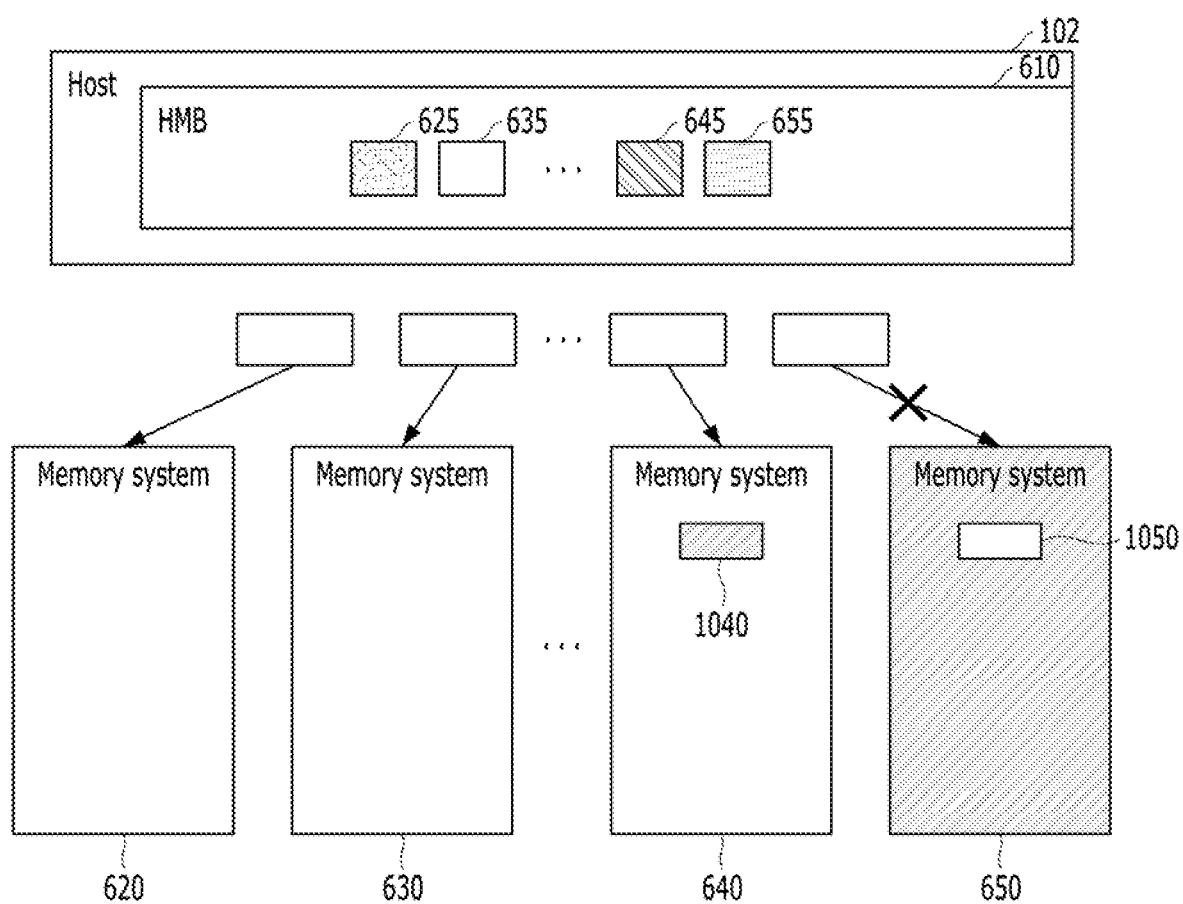
FIG. 10 is a diagram illustrating an operation of the host in accordance with an embodiment of the present invention.

FIG. 10 is a diagram illustrating an operation of the host 102 in accordance with an embodiment of the present invention.

First, the plurality of memory systems 620 to 650 may request the host 102 to update the third threshold values included in the plurality of meta-data 625 to 655 respectively corresponding to the plurality of memory systems 620 to 650.

When a temperature of one memory system 650 among the plurality of memory systems 620 to 650 increases over the third threshold value representing the temperature of the memory system 650 and included in a corresponding meta-data 655 among the plurality of meta-data 625 to 655, the host 102 may control the plurality of memory systems 620 to 650 not to store user data in the memory system 650 among the plurality of memory systems 620 to 650. That is, the host 102 may throttle the memory system 650 in order to prevent system error by decreasing the temperature of the memory system 650. Further, the host 102 may control the plurality of memory systems 620 to 650 to store user data in another memory system other than the memory system 650 among the plurality of memory systems 620 to 650.

However, when data 1050 is to be read from the throttled memory system 650, the host 102 may control the plurality of memory systems 620 to 650 to read the data from another memory system 1040 storing duplicated data 1040 corresponding to the data 1050 stored in the throttled memory system 650. As described above, one or more of duplicated data and parity data corresponding to user data may be stored in the plurality of memory systems 620 to 650 in distributed way according to the security level of the user data.

As described above, in accordance with an embodiment of the present invention, the data processing system 100 may store user data and one or more of duplicated data and parity data corresponding to the user data into the plurality of memory systems 620 to 650 in distributed way or may read the user data and one or more of the duplicated data and the parity data corresponding to the user data from the plurality of memory systems 620 to 650 according to the plurality of meta-data 625 to 655 stored in the HMB 610 of the host 102. Accordingly, efficiency of data processing may be maximized. Further, differently from the RAID system 500 described with reference to FIG. 5, economic efficiency may be increased since the data processing system 100 does not include a separated controller (e.g., the RAID controller 510) for controlling the plurality of memory systems 620 to 650.

FIGS. 11 to 18 are diagrams schematically illustrating application examples of the data processing system of FIGS. 1 to 9 according to various embodiments.

Figure 11:
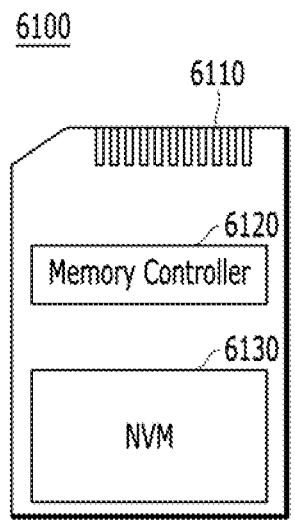
FIGS. 11 to 18 are diagrams schematically illustrating application examples of a data processing system, in accordance with various embodiments of the present invention.

FIG. 11 is a diagram schematically illustrating an example of the data processing system including the memory system in accordance with the present embodiment. FIG. 11 schematically illustrates a memory card system to which the memory system in accordance with the present embodiment is applied.

Referring to FIG. 11, the memory card system 6100 may include a memory controller 6120, a memory device 6130, and a connector 6110.

More specifically, the memory controller 6120 may be connected to the memory device 6130 embodied by a nonvolatile memory, and may access the memory device 6130. For example, the memory controller 6120 may control read, write, erase, and background operations of the memory device 6130. The memory controller 6120 may provide an interface between the memory device 6130 and a host, and drive firmware for controlling the memory device 6130. That is, the memory controller 6120 may correspond to the controller 130 of the memory system 110 described with reference to FIGS. 1 to 10, and the memory device 6130 may correspond to the memory device 150 of the memory system 110 described with reference to FIGS. 1 to 10.

Thus, the memory controller 6120 may include a RAM, a processing unit, a host interface, a memory interface, and an error correction (ECC) unit. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI, and Bluetooth. Thus, the memory system and the data processing system in accordance with the present embodiment may be applied to wired/wireless electronic devices or mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM), and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. Also the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC), and a universal flash storage (UFS).

Figure 12:
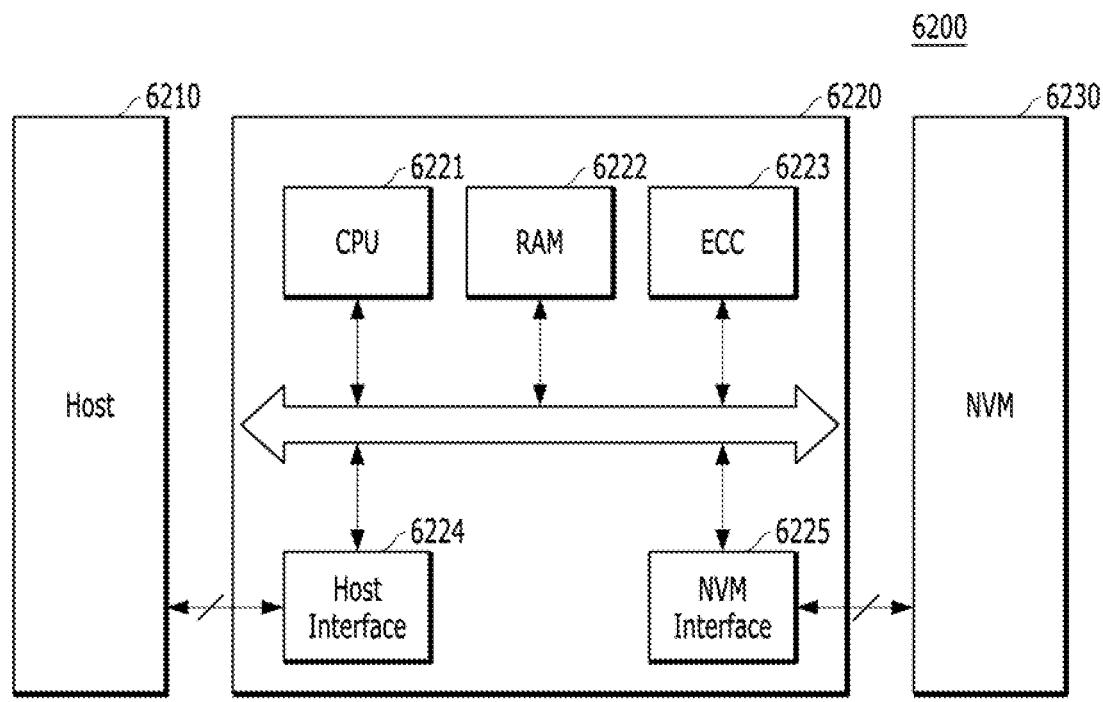

FIG. 12 is a diagram schematically illustrating another example of the data processing system including a memory system, in accordance with the present embodiment.

Referring to FIG. 12, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 10, and the memory controller 6220 may correspond to the controller 130 in the memory system 110 described in FIGS. 1 to 10.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management, and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC, or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 13:
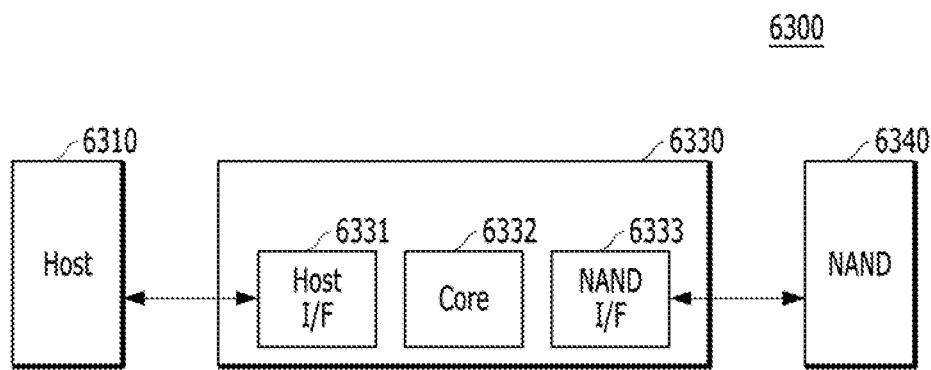

FIG. 13 is a diagram schematically illustrating another example of the data processing system including the memory system in accordance with an embodiment. FIG. 13 schematically illustrates an embedded Multi-Media Card (eMMC) to which the memory system in accordance with an embodiment is applied.

Referring to FIG. 13, the eMMC 6300 may include a controller 6330 and a memory device 6340 embodied by one or more NAND flash memories. The controller 6330 may correspond to the controller 130 in the memory system 110 of FIG. 1, and the memory device 6340 may correspond to the memory device 150 in the memory system 110 of FIG. 1.

More specifically, the controller 6330 may be connected to the memory device 6340 through a plurality of channels. The controller 6330 may include one or more cores 6332, a host interface 6331 and a memory interface, for example, a NAND interface 6333.

The core 6332 may control the operations of the eMMC 6300, the host interface 6331 may provide an interface function between the controller 6330 and the host 6310, and the NAND interface 6333 may provide an interface function between the memory device 6340 and the controller 6330. For example, the host interface 6331 may serve as a parallel interface, for example, MMC interface as described with reference to FIG. 1. Furthermore, the host interface 6331 may serve as a serial interface, for example, UHS ((Ultra High Speed)-I/UHS-II) interface.

FIGS. 14 to 17 are diagrams schematically illustrating other examples of the data processing system Including the memory system in accordance with an embodiment. FIGS. 14 to 17 schematically illustrate UFS (Universal Flash Storage) systems to which the memory system in accordance with an embodiment is applied.

Referring to FIGS. 14 to 17, the UFS systems 6400, 6500, 6600, and 6700 may include hosts 6410, 6510, 6610, and 6710, UFS devices 6420, 6520, 6620, and 6720, and UFS cards 6430, 6530, 6630 and 6730, respectively. The hosts 6410, 6510, 6610, and 6710 may serve as application processors of wired/wireless electronic devices or mobile electronic devices, the UFS devices 6420, 6520, 6620, and 6720 may serve as embedded UFS devices, and the UFS cards 6430, 6530, 6630, and 6730 may serve as external embedded UFS devices or removable UFS cards.

The hosts 6410, 6510, 6610, and 6710, the UFS devices 6420, 6520, 6620, and 6720, and the UFS cards 6430, 6530, 6630, and 6730 in the respective UFS systems 6400, 6500, 6600, and 6700 may communicate with external devices, for example, wired/wireless electronic devices or mobile electronic devices through UFS protocols, and the UFS devices 6420, 6520, 6620, and 6720 and the UFS cards 6430, 6530, 6630, and 6730 may be embodied by the memory system 110 illustrated in FIG. 1. For example, in the UFS systems 6400, 6500, 6600, and 6700, the UFS devices 6420, 6520, 6620 and 6720 may be embodied in the form of the data processing system 6200 or the eMMC 6300 described with reference to FIGS. 12 to 13, and the UFS cards 6430, 6530, 6630, and 6730 may be embodied in the form of the memory card system 6100 described with reference to FIG. 11.

Furthermore, in the UFS systems 6400, 6500, 6600, and 6700, the hosts 6410, 6510, 6610, and 6710, the UFS devices 6420, 6520, 6620, and 6720, and the UFS cards 6430, 6530, 6630, and 6730 may communicate with each other through an UFS interface, for example, Unified Protocol in Mobile Industry Processor Interface (MIPI M-PHY and MIPI UniPro). Furthermore, the UFS devices 6420, 6520, 6620, and 6720 and the UFS cards 6430, 6530, 6630, and 6730 may communicate with each other through various protocols other than the UFS protocol, for example, UFDs, MMC, SD, mini-SD, and micro-SD.

Figure 14:
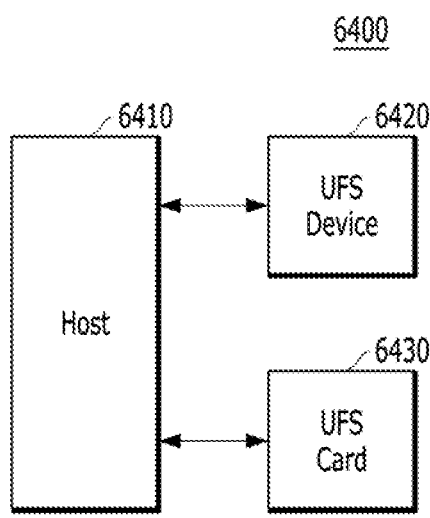

In the UFS system 6400 illustrated in FIG. 14, each of the host 6410, the UFS device 6420, and the UFS card 6430 may include UniPro. The host 6410 may perform a switching operation in order to communicate with the UFS device 6420 and the UFS card 6430. In particular, the host 6410 may communicate with the UFS device 6420 or the UFS card 6430 through link layer switching, for example, L3 switching at the UniPro. At this time, the UFS device 6420 and the UFS card 6430 may communicate with each other through link layer switching at the UniPro of the host 6410. In the present embodiment, the configuration in which one UFS device 6420 and one UFS card 6430 are connected to the host 6410 has been exemplified for convenience of description. However, a plurality of UFS devices and UFS cards may be connected in parallel or in the form of a star to the host 6410, and a plurality of UFS cards may be connected in parallel or in the form of a star to the UFS device 6420 or connected in series or in the form of a chain to the UFS device 6420.

Figure 15:
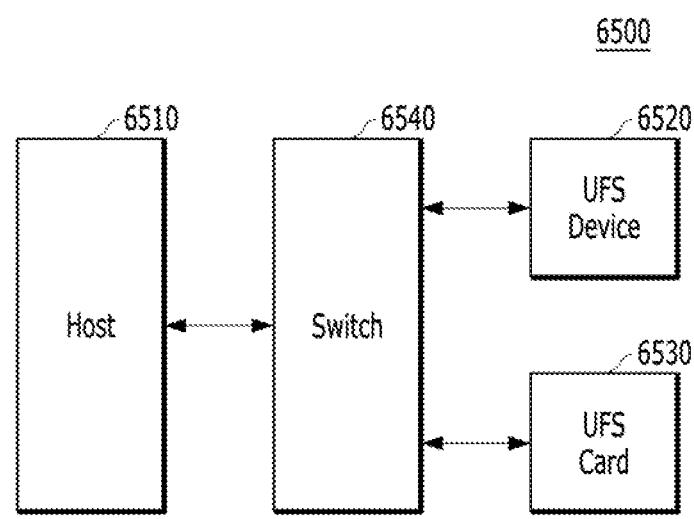

In the UFS system 6500 illustrated in FIG. 15, each of the host 6510, the UFS device 6520 and the UFS card 6530 may include UniPro and the host 6510 may communicate with the UFS device 6520 or the UFS card 6530 through a switching module 6540 performing a switching operation, for example, through the switching module 6540 which performs link layer switching at the UniPro, for example, L3 switching. The UFS device 6520 and the UFS card 6530 may communicate with each other through link layer switching of the switching module 6540 at UniPro. In the present embodiment, the configuration in which one UFS device 6520 and one UFS card 6530 are connected to the switching module 6540 has been exemplified for convenience of description. However, a plurality of UFS devices and UFS cards may be connected in parallel or in the form of a star to the switching module 6540, and a plurality of UFS cards may be connected in series or in the form of a chain to the UFS device 6520.

Figure 16:
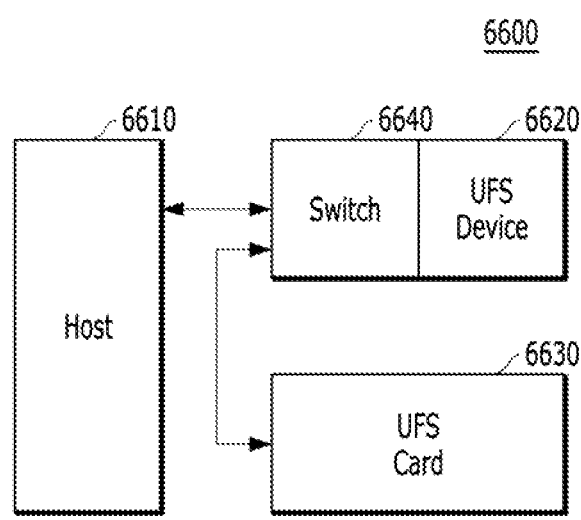

In the UFS system 6600 illustrated in FIG. 16, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. At this time, the UFS device 6620 and the UFS card 6630 may communicate with each other through link layer switching of the switching module 6640 at the UniPro, and the switching module 6640 may be integrated as one module with the UFS device 6620 inside or outside the UFS device 6620. In the present embodiment the configuration in which one UFS device 6620 and one UFS card 6630 are connected to the switching module 6640 has been exemplified for convenience of description. However, a plurality of modules each including the switching module 6640 and the UFS device 6620 may be connected in parallel or in the form of a star to the host 6610 or connected in series or in the form of a chain to each other. Furthermore, a plurality of UFS cards may be connected in parallel or in the form of a star to the UFS device 6620.

Figure 17:
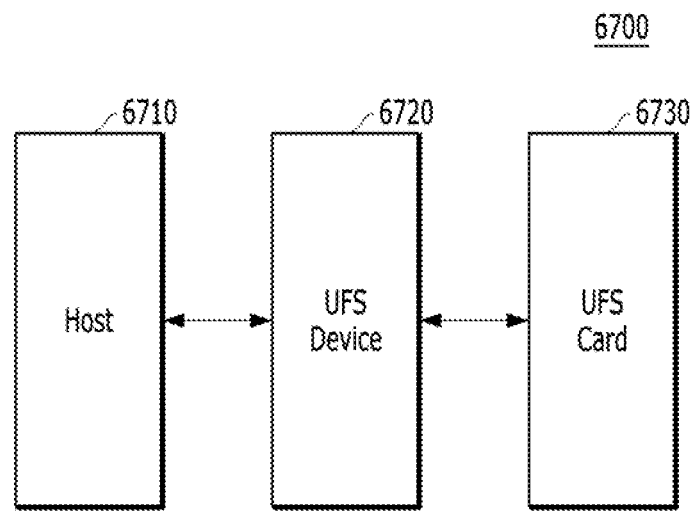

In the UFS system 6700 illustrated in FIG. 17, each of the host 6710, the UFS device 6720, and the UFS card 6730 may include M-PHY and UniPro. The UFS device 6720 may perform a switching operation in order to communicate with the host 6710 and the UFS card 6730. In particular, the UFS device 6720 may communicate with the host 6710 or the UFS card 6730 through a switching operation between the M-PHY and UniPro module for communication with the host 6710 and the M-PHY and UniPro module for communication with the UFS card 6730, for example, through a target identifier (ID) switching operation. At this time, the host 6710 and the UFS card 6730 may communicate with each other through target ID switching between the M-PHY and UniPro modules of the UFS device 6720. In the present embodiment, the configuration in which one UFS device 6720 is connected to the host 6710 and one UFS card 6730 is connected to the UFS device 6720 has been exemplified for convenience of description. However, a plurality of UFS devices may be connected in parallel or in the form of a star to the host 6710, or connected in series or in the form of a chain to the host 6710, and a plurality of UFS cards may be connected in parallel or in the form of a star to the UFS device 6720 or connected in series or in the form of a chain to the UFS device 6720.

Figure 18:
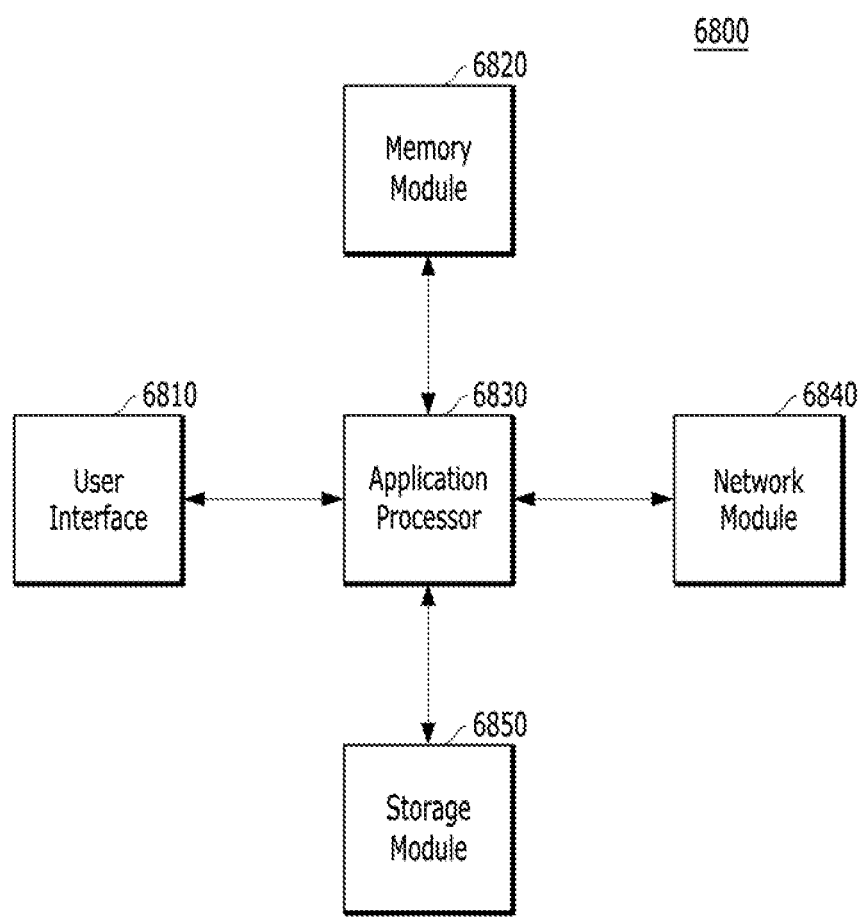

FIG. 18 is a diagram schematically illustrating another example of the data processing system including the memory system in accordance with an embodiment. FIG. 18 is a diagram schematically illustrating a user system to which the memory system in accordance with an embodiment is applied.

Referring to FIG. 18, the user system 6800 may include an application processor 6830, a memory module 6820, a network module 6840, a storage module 6850, and a user interface 6810.

More specifically, the application processor 6830 may drive components included in the user system 6800, for example, an OS, and include controllers interfaces and a graphic engine which control the components included in the user system 6800. The application processor 6830 may be provided as a System-on-Chip (SoC).

The memory module 6820 may be used as a main memory, work memory, buffer memory, or cache memory of the user system 6800. The memory module 6820 may include a volatile RAM such as DRAM, SDRAM, DDR SDRAM, DDR2 SDRAM, DDR3 SDRAM, LPDDR SDARM, LPDDR3 SDRAM, or LPDDR3 SDRAM or a nonvolatile RAM such as PRAM, ReRAM, MRAM, or FRAM. For example, the application processor 6830 and the memory module 6820 may be packaged and mounted, based on POP (Package on Package).

The network module 6840 may communicate with external devices. For example, the network module 6840 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6840 may be included in the application processor 6830.

The storage module 6850 may store data, for example, data received from the application processor 6830, and then may transmit the stored data to the application processor 6830. The storage module 6850 may be embodied by a nonvolatile semiconductor memory device such as a phase-change RAM (PRAM), a magnetic RAM (MRAM), a resistive RAM (ReRAM), a NAND flash, NOR flash, and 3D NAND flash, and provided as are movable storage medium such as a memory card or external drive of the user system 6800. The storage module 6850 may correspond to the memory system 110 described with reference to FIG. 1. Furthermore, the storage module 6850 may be embodied as an eMMC and UFS as described above with reference to FIGS. 11 to 17.

The user interface 6810 may include interfaces for inputting data or commands to the application processor 6830 or outputting data to an external device. For example, the user interface 6810 may include user input interfaces such as a keyboard, a keypad, a button, a touch panel, a touch screen, a touch pad, a touch ball, a camera, a microphone, a gyroscope sensor, a vibration sensor, and a piezoelectric element, and user output interfaces such as a liquid crystal display (LCD), an organic light emitting diode (OLED) display device an active matrix OLED (AMOLED) display device, an LED, a speaker, and a motor.

Furthermore, when the memory system 110 of FIG. 1 is applied to a mobile electronic device of the user system 6800, the application processor 6830 may control the operations of the mobile electronic device, and the network module 6840 may serve as a communication module for controlling wired/wireless communication with an external device. The user interface 6810 may display data processed by the processor 6830 on a display/touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as defined in the following claims.

What is claimed is:

1. A data processing system comprising:
a host configured to provide an access request; and
a plurality of memory systems configured to store or read data thereto or therefrom in response to the access request,
wherein the host includes a host memory buffer configured to store a plurality of meta-data respectively corresponding to the plurality of memory systems,
wherein each of the plurality of meta-data includes a first threshold value representing unused storage capacity for user data in a memory system of the plurality of memory systems corresponding to the meta-data, a second threshold value representing a number of read operations for logical block addresses (LBAs) of the corresponding memory system, a third threshold value representing a temperature of the corresponding memory system, and LBAs of the corresponding memory system of the plurality of memory systems.

2. The data processing system of claim 1,
wherein the host further updates the plurality of meta-data including the first threshold values corresponding to the plurality of memory systems in response to requests from the plurality of memory systems, respectively, and
wherein the host further divides data having a greater size than the first threshold value among sequentially generated data such that each of a plurality of divided data has a predetermined size, and controls the plurality of memory systems to store the divided data in a distributed way.

3. The data processing system of claim 1, wherein the host further controls the plurality of memory systems to store the data in a distributed way according to a security level of the data.

4. The data processing system of claim 3, wherein the host further controls the plurality of memory systems to store one or more of duplicated data and parity data corresponding to the data stored in a distributed way according to the security level of the data.

5. The data processing system of claim 1,
wherein the host further updates the plurality of meta-data including the LBAs corresponding to the plurality of memory systems in response to requests from the plurality of memory systems, respectively, and
wherein the host further controls the plurality of memory systems to store the data in a distributed way according to the plurality of updated meta-data.

6. The data processing system of claim 5, wherein the host further controls the plurality of memory systems to store parity data and duplicated data corresponding to the data in another memory system, which is different from a memory system storing the data, among the plurality of memory systems when the data is stored in the memory system.

7. The data processing system of claim 1,
wherein the host further updates the plurality of meta-data including the second threshold values corresponding to the plurality of memory systems in response to requests from the plurality of memory systems, respectively,
wherein, when a first data stored in a first memory system among the plurality of memory systems is read a greater number of times than the second threshold value included in the plurality of updated meta-data, the host further controls the plurality of memory systems to move the first data to a second memory system among the plurality of memory systems, and
wherein the second memory system requests the host to update a meta-data corresponding to the second memory system among the plurality of meta-data such that the meta-data corresponding to the second memory system includes the LBA corresponding to the first data.

8. The data processing system of claim 1,
wherein the host further updates the plurality of meta-data including the third threshold values corresponding to the plurality of memory systems in response to requests from the plurality of memory systems, respectively, and
wherein the host further controls the plurality of memory systems to throttle one or more memory systems having a greater temperature than the third threshold value among the plurality of memory systems.

9. The data processing system of claim 8, wherein the host further controls the plurality of memory systems to first store the data in another memory system other than the throttled memory systems among plurality of memory systems.

10. The data processing system of claim 8, wherein, when data is to be read from the throttled memory systems, the host further controls the plurality of memory systems to read duplicated data corresponding to the data to be read and stored in another memory system other than the throttled memory system among the plurality of memory systems.

11. The data processing system of claim 1, wherein
the host is configured to access memory systems according to a redundant array of independent disks (RAID) levels without utilizing a RAID controller which consumes physical space, and access the plurality of meta-data respectively corresponding to the plurality of memory systems and stored in the host memory buffer of the host, and
wherein the host controls, based on the meta-data, the memory systems to store user data in a distributed way for balancing storage capacities and access counts of the memory systems.

12. An operating method of a data processing system including a host having a host memory buffer and including a plurality of memory systems, the operating method comprising:
a first step of updating, by the host, a plurality of meta-data stored in the host memory buffer of the host and corresponding to the plurality of memory systems in response to requests from the plurality of memory systems, respectively; and
a second step of controlling, by the host, the plurality of memory systems to store data in a distributed way according to the plurality of meta-data,
wherein each of the plurality of meta-data includes a first threshold value representing unused storage capacity for user data in a memory system of the plurality of memory systems corresponding to the meta-data, a second threshold value representing a number of read operations for logical block addresses (LBAs) of the corresponding memory system, a third threshold value representing a temperature of the corresponding memory system, and LBAs of the corresponding memory system of the plurality of memory systems.

13. The operating method of claim 12,
wherein the first step is performed by updating the plurality of meta-data including the first threshold values corresponding to the plurality of memory systems in response to requests from the plurality of memory systems, respectively, and
wherein the second step is performed by dividing data having a greater size than the first threshold value among sequentially generated data such that each of a plurality of divided data has a predetermined size, and controlling the plurality of memory systems to store the divided data in a distributed way.

14. The operating method of claim 12, wherein the second step is performed by further controlling the plurality of memory systems to store the data in a distributed way according to a security level of the data.

15. The operating method of claim 14, further comprising controlling, by the host, the plurality of memory systems to store one or more of duplicated data and parity data corresponding to the data stored in a distributed way according to the security level of the data.

16. The operating method of claim 12,
wherein the first step is performed by updating the plurality of meta-data including the LBAs corresponding to the plurality of memory systems in response to requests from the plurality of memory systems, respectively, and
wherein the second step is performed by controlling the plurality of memory systems to store the data in a distributed way according to the plurality of updated meta-data.

17. The operating method of claim 16, further comprising controlling, by the host, the plurality of memory systems to store parity data and duplicated data corresponding to the data in another memory system, which is different from a memory system storing the data, among the plurality of memory systems when the data is stored in the memory system.

18. The operating method of claim 12,
wherein the first step is performed by updating the plurality of meta-data including the second threshold values corresponding to the plurality of memory systems in response to requests from the plurality of memory systems, respectively, and
further comprising, when a first data stored in a first memory system among the plurality of memory systems is read a greater number of times than the second threshold value included in the plurality of updated meta-data:
a third step of controlling, by the host, the plurality of memory systems to move the first data to a second memory system among the plurality of memory systems; and
a fourth step of requesting, by the second memory system, the host to update a meta-data corresponding to the second memory system among the plurality of meta-data such that the meta-data corresponding to the second memory system includes the LBA corresponding to the first data.

19. The operating method of claim 12,
wherein the first step is performed by updating the plurality of meta-data including the third threshold values corresponding to the plurality of memory systems in response to requests from the plurality of memory systems, respectively, and
wherein the second step is performed by controlling the plurality of memory systems to throttle one or more memory systems having a greater temperature than the third threshold value among the plurality of memory systems.

20. The operating method of claim 19, further comprising controlling, by the host, the plurality of memory systems to first store the data in another memory system other than the throttled memory systems among plurality of memory systems.

21. The operating method of claim 19, further comprising controlling, by the host, when data is to be read from the throttled memory systems, the plurality of memory systems to read duplicated data corresponding to the data to be read and stored in another memory system other than the throttled memory system among the plurality of memory systems.

22. A data processing system comprising:
- a host having a host memory buffer which is configured to store a plurality of meta-data; and
- a plurality of memory systems configured to store or read data in response to an access request made from the host,
- wherein each meta-data of the plurality of meta-data corresponds to a different memory system of the plurality of memory systems,
- wherein the meta-data for the different memory system includes logical block addresses (LBAs), unused storage capacity for user data, a number of read operations for the LBAs, and a temperature,
- wherein the host updates the corresponding meta-data including the LBAs in response to requests made from the different memory system, and
- wherein the host controls the plurality of memory systems to store data in a distributed manner according to the updated meta-data for each memory system of the plurality of memory systems.

* * * * *

UNITED STATES PATENT AND TRADEMARK OFFICE
CERTIFICATE OF CORRECTION

PATENT NO. : 10,585,792 B2
APPLICATION NO. : 15/832005
DATED : March 10, 2020
INVENTOR(S) : Soong-Sun Shin et al.

It is certified that error appears in the above-identified patent and that said Letters Patent is hereby corrected as shown below:

On the Title Page

Item (72) should read:
(72) Inventors: Soong-Sun Shin, Gyeonggi-do (KR);
Duck-Hoi Koo, Gyeonggi-do (KR);
Yong-Tae Kim, Gyeonggi-do (KR);
Cheon-Ok Jeong, Gyeonggi-do (KR)

Signed and Sealed this
Fifth Day of May, 2020

Andrei Iancu
*Director of the United States Patent and Trademark Office*